April 8, 1958  E. W. SCHWEIKERT  2,829,434
CHEESE CUTTERS
Filed Feb. 13, 1956
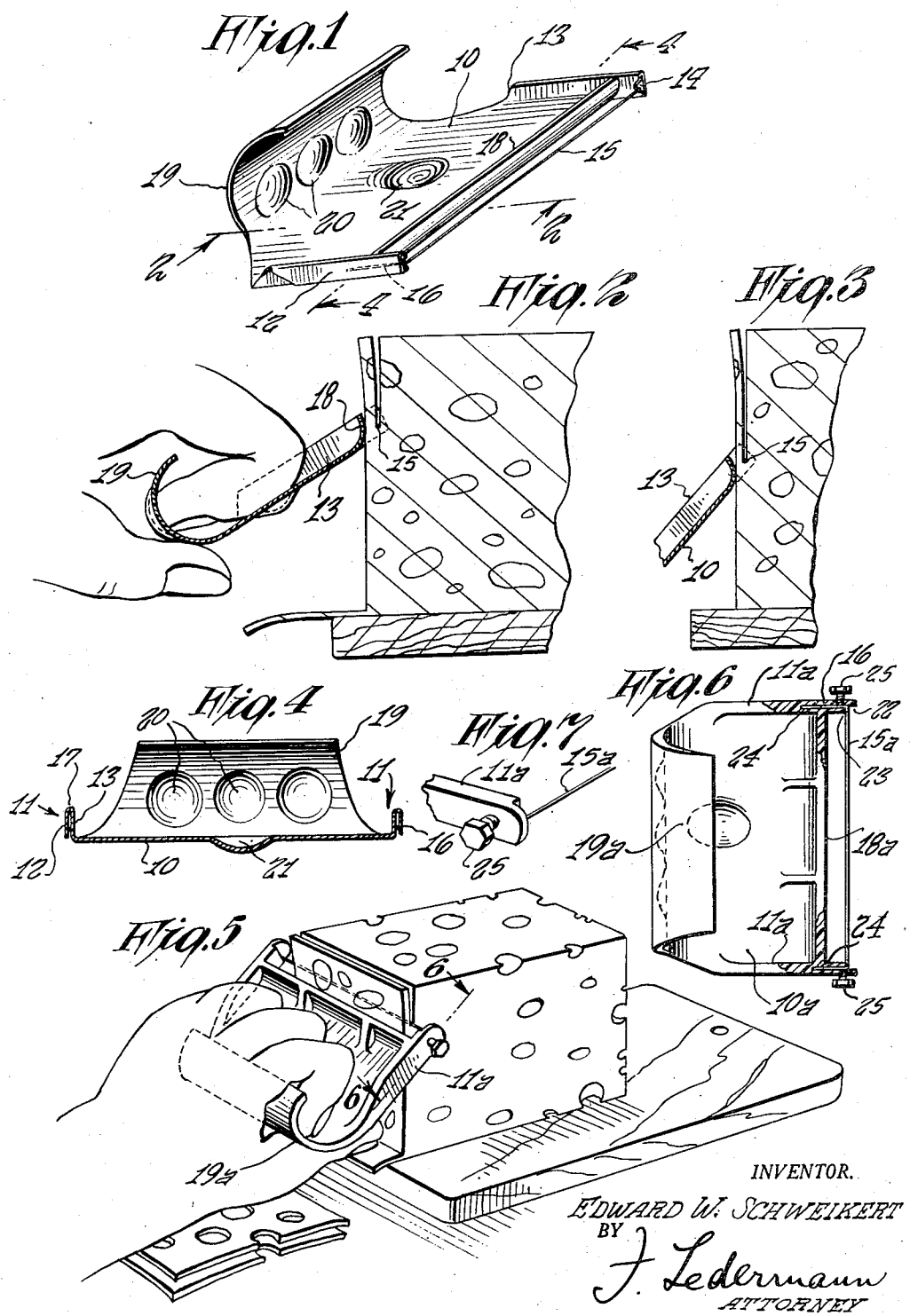
INVENTOR.
EDWARD W. SCHWEIKERT
BY
J. Ledermann
ATTORNEY

United States Patent Office 2,829,434
Patented Apr. 8, 1958

2,829,434

CHEESE CUTTERS

Edward W. Schweikert, New York, N. Y.

Application February 13, 1956, Serial No. 565,044

2 Claims. (Cl. 30—116)

This invention relates to cheese cutters or slicers, and the main object thereof is the provision of a novel, practical and useful cheese cutter by means of which a slab or slice of cheese may be cut from a block in a minimum of time and with a minimum of labor as well as with a maximum of accuracy.

Another object of the invention is the provision of a cheese cutter having the inherent characteristic of being able to cut slices of varying thickness within the range of the cutter.

A further object of the invention is the provision of the cheese cutter with a grip which enables the user to obtain proper leverage in using the device.

The above as well as additional objects will be clarified in the following description, wherein characters of reference refer to like-numbered parts in the accompanying drawing. It is to be noted that the drawing is intended solely for the purpose of illustration, and that it is neither intended nor desired to limit the invention necessarily to any or all of the exact details of construction shown except insofar as they may be deemed essential to the invention.

Referring briefly to the drawing, Fig. 1 is a perspective view of the cheese cutter of this invention.

Fig. 2 is a sectional view of the same taken on the line 2—2 of Fig. 1 and showing also, in cross-section, a block of cheese to which the cutter is applied in the act of cutting a slice therefrom.

Fig. 3 is a fragmentary view similar to Fig. 2, but showing the angle of the cheese cutter with respect to the vertical reduced to obtain a thinner slice.

Fig. 4 is a sectional view taken on the line 4—4 of Fig. 1.

Fig. 5 is a perspective view of a slightly modified form of the cutter and a block of cheese being cut thereby, better illustrating the application thereof.

Fig. 6 is a sectional view taken on the line 6—6 of Fig. 5.

Fig. 7 is a fragmentary perspective view, with parts broken away and partly in section, of the cheese cutter of Fig. 5.

Referring in detail to the drawings, the cheese cutter comprises a substantially flat body 10 having at the opposed sides thereof walls 11. These walls are formed by first turning the edges of the body 10 upward at right angles and then doubling the same back at right angles, so that each wall 11 is really a double wall formed of the two parts 12 and 13. Each of the inner wall portions 13 has a notch 14 cut out of its extremity. A cutter wire 15 is mounted between the walls 11 by having its ends 16, after being bent at right angles, inserted through the notches 14 into the space or longitudinal passage between the wall portions 12—13 of each wall 11, and then clamping the said portions together to retain the wire ends securely therebetween. It is to be noted that the lowermost point of the notch 14 is positioned below, that is in the direction toward the plate 10, the longitudinal median line of the wall portions 13, thereby positioning the wire 15 nearer the plane of the plate 10 than the upper edges 17 of the walls 11.

Between the outer ends of the walls 11, the plate 10 is cut away along its lateral edges for a short distance and the tongue 18 thus resulting is bent upward and rounded, substantially as shown. Thus the horizontal distance between the wire 15 and the tongue 18 may be varied by changing the angle of the plate 10 with respect to the horizontal, since the horizontal distance between the wire and the tongue varies as the plate is turned about the wire as an axis.

The rear end of the plate 10 is turned upward and rounded to provide an arched grip 19 for grasping the cutter. The inner wall of the grip 10 is further provided with a series of depressions 20 to receive the finger tips, and the plate 10 also has a depression 21 to receive the knuckle of one finger. Thus the user can obtain a tight and secure grip on the device.

When used to cut cheese, the thickness of the desired slice can be controlled within limits by altering the angle of the plate 10 to the horizontal, as mentioned above and as is apparent in Figs. 2 and 3, the former showing a thicker slice and the latter a thinner one.

Figs. 5, 6 and 7 illustrate a modified construction of the cutter, wherein, however, the application and use thereof are the same as above described. The modified cutter is, like that above described, adapted to be made of any desired material, but it is particularly adaptable for manufacture out of any of the common types of plastic material on the market.

In this modified form, the plate 10a is substantially the same as the plate 10, and the same may also be said of the other parts shown in Figs. 5, 6 and 7 whose reference numerals are the same as in the case of the first described form, followed by the subscript a, except for the side walls 11a.

The side walls 11a have opposed cut-outs 22 on the inner sides of their outer extremities, thus providing shoulders 23 lying in a common plane at right angles to the plane of the plate 10a. Each wall 11a has an opening or passage 24 of about the thickness of the wire 15, extending longitudinally thereinto from the shoulder 23. On the outsides of the walls 11a, set screws 25 are mounted to screw into the said walls against the bent ends 16 of the wire 15, thus holding the wire tightly. In case the wire 15 breaks, in this modified form it may readily be replaced in an obvious manner.

Obviously, modifications in form or structure may be made without departing from the spirit or scope of the invention.

I claim:

1. A cheese cutter comprising a substantially flat plate having the forward edge thereof turned upward and rounded, said plate having opposed side walls thereon substantially at right angles thereto and extending forward an equal distance beyond the rounded edge of the plate, the forwardly extending portions of the side walls having opposed cut-outs of equal length longitudinally with respect to the side walls cut away from the inner sides of the forward extremities of the side walls, said cut-outs having a depth laterally with respect to the side walls equal to approximately one-half the thickness of the side walls, said length of the cut-outs being equal to less than the distance by which the side walls extend forward beyond said rounded edges of the plate, said cut-outs thereby providing on the rearward ends thereof aligned shoulders lying equidistant from said rounded edge, each of said side walls having a longitudinal passage extending rearward from the said shoulder thereon and substantially intermediate the thickness of the side wall, a wire including a straight intermediate portion and end portions at right angles to the intermediate portion, said wire being positioned with the intermediate portion in contact with said shoulders and said end portions thereof registering in said passages, and means for locking said end portions of the wire in said passages.

2. A cheese cutter according to claim 1, said means comprising aligned set screws in said side walls spaced longitudinally rearward from said shoulders and extending into said passages to engage said ends of the wire.

References Cited in the file of this patent

UNITED STATES PATENTS

| | | |
|---|---|---|
| 2,093,867 | Fitzgerald | Sept. 21, 1937 |
| 2,332,307 | Dennis | Oct. 19, 1943 |
| 2,461,796 | Wilquin | Feb. 15, 1949 |
| 2,503,839 | Pedersen | Apr. 11, 1950 |
| 2,611,952 | Chambers | Sept. 30, 1952 |

FOREIGN PATENTS

| | | |
|---|---|---|
| 95,211 | Swiss | June 16, 1922 |